March 5, 1940.  E. R. CHAMPION ET AL  2,192,257
EDUCATIONAL DEVICE
Filed Oct. 24, 1938  2 Sheets-Sheet 1
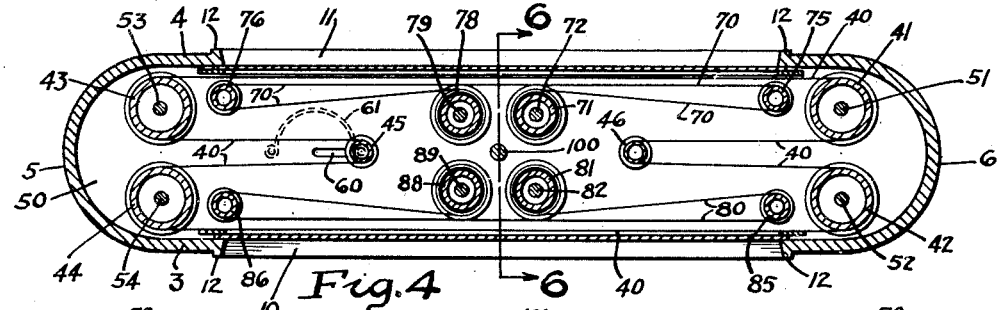
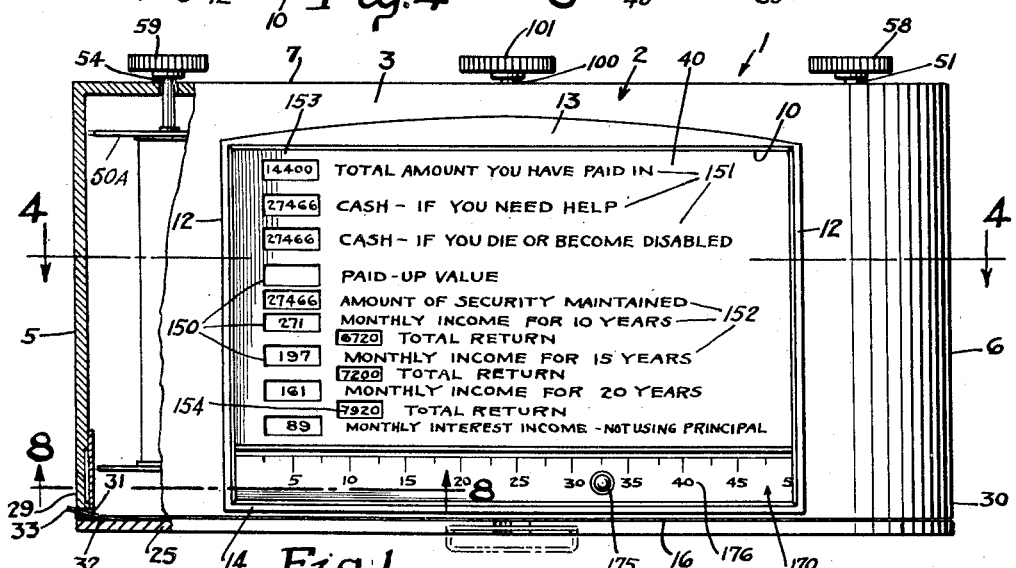
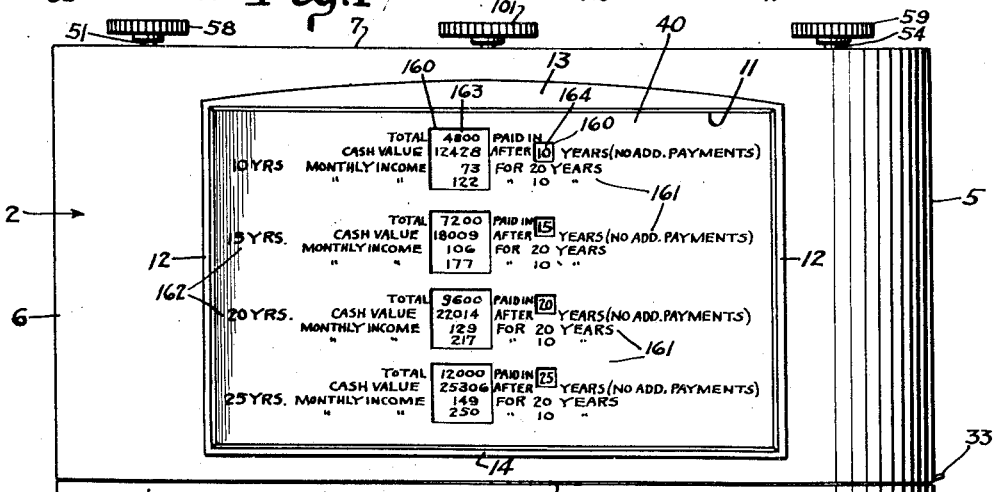
INVENTORS
EDGAR R. CHAMPION
GLENN J. WOREL
BY Paul, Paul, Moore & Giese
ATTORNEYS March 5, 1940. E. R. CHAMPION ET AL 2,192,257
EDUCATIONAL DEVICE
Filed Oct. 24, 1938 2 Sheets-Sheet 2
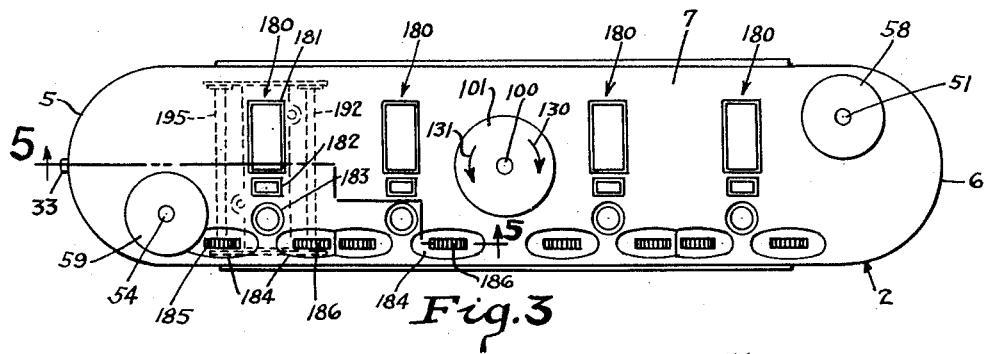
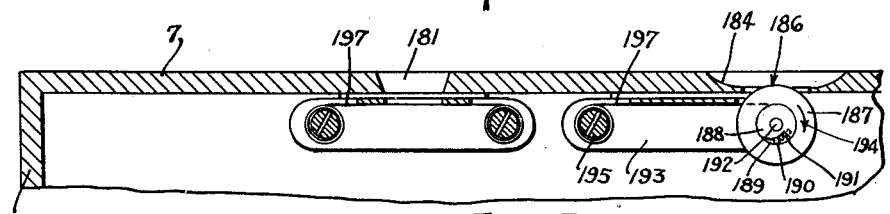
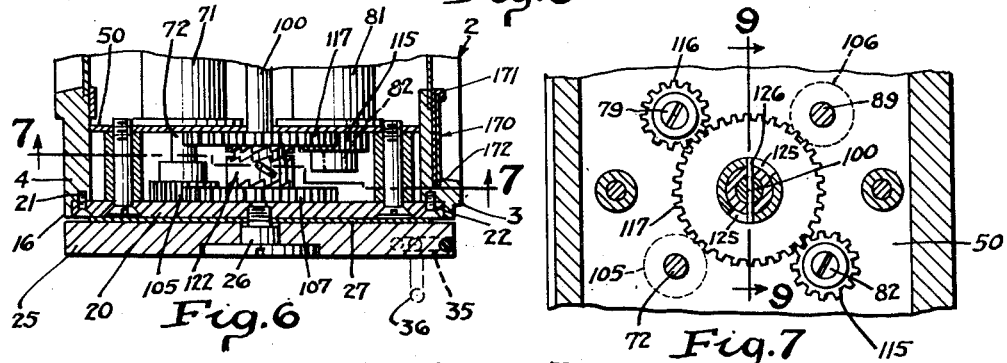
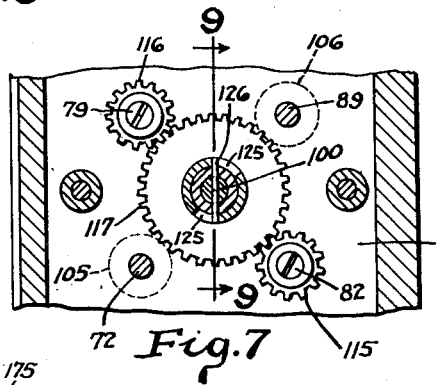
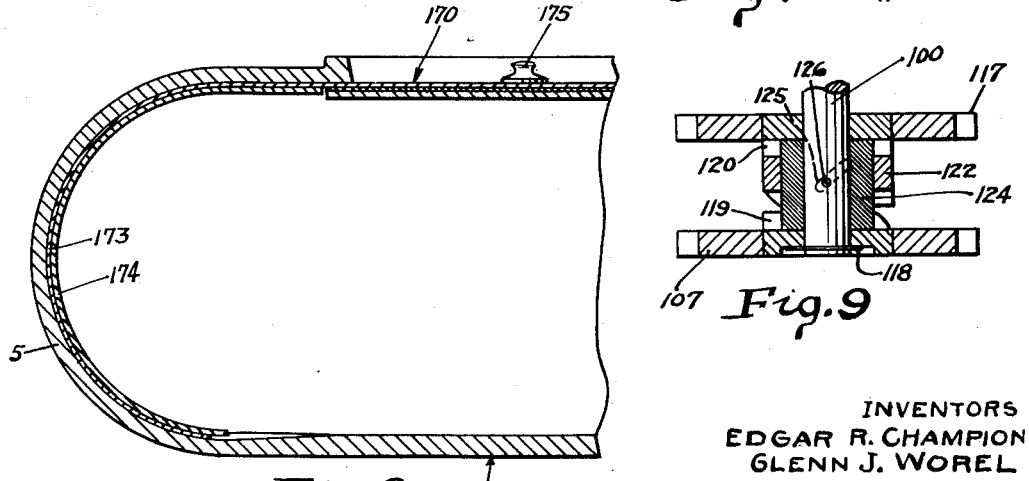
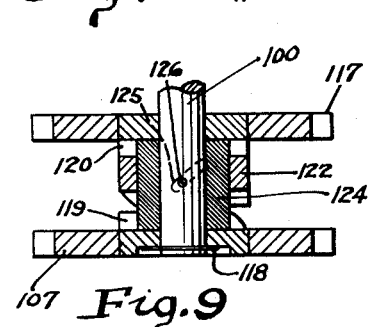
INVENTORS
EDGAR R. CHAMPION
GLENN J. WOREL
BY Paul, Paul, Moore & Giese
ATTORNEYS Patented Mar. 5, 1940

2,192,257

UNITED STATES PATENT OFFICE 2,192,257

EDUCATIONAL DEVICE

Edgar R. Champion and Glenn J. Worel, Minneapolis, Minn., assignors, by direct and mesne assignments, to Investors Syndicate, Minneapolis, Minn., a corporation of Minnesota Application October 24, 1938, Serial No. 236,728

10 Claims. (Cl. 35—24)

The present invention relates to an apparatus for graphically displaying a large amount of data such as that representing a planned accumulation of wealth over a period in the human life span, and other data representing payment options for such plans. The apparatus is particularly adapted for the use of representatives of insurance and investment companies, who constantly require reference to computed data in explaining various programs to their clients.

It is an object of the present invention to provide a means for readily and attractively displaying computed data, and particularly for displaying such data graphically.

It is a further object of the invention to provide an apparatus having an opening for displaying data.

It is also an object to provide a double display cabinet having opposed openings each of which is shaped to simulate a theatre opening for simultaneously displaying related data.

It is a further object to provide a portable display container having a plurality of data display openings, which is mounted for ready rotation upon a base, so as to facilitate display first of one and then of another of said openings.

It is also an object of the invention to provide a mechanism for simultaneously moving a web across a pair of oppositely positioned display openings so as simultaneously to present data displaying openings in said web at various positions in said openings.

It is a further object of the invention to provide a mechanism for simultaneously reeling a pair of data-displaying webs from full reels to empty reels while simultaneously maintaining said webs tensioned.

It is a further object of the invention to provide a pair of elongated data displaying webs behind a pair of display openings, and a winding reel for each end of each web, together with mechanism for maintaining said webs in predetermined condition of winding with respect to each other throughout the winding range of said webs, so that when certain data is displayed through a predetermined position, correlated data on the other web will simultaneously be positioned to be displayed at a predetermined position.

It is a further object of the invention to provide display apparatus including a transversely movable data-displaying web positioned behind an opening in said device, together with a second transversely movable web adjacent said opening for positioning in correspondence with said webs.

Other and further objects are those inherent in the means and apparatus herein illustrated, described and claimed.

The invention is illustrated with reference to the drawings in which—

Figure 1 is a front elevation view of the device, partly broken away.

Figure 2 is a rear elevation view of the device shown in Figure 1.

Figure 3 is a plan view of the device.

Figure 4 is a sectional view in the direction of the arrows and along the line 4—4 of Figure 1.

Figure 5 is an enlarged fragmentary view in section along the lines 5—5 of Figure 3.

Figure 6 is an enlarged view in section of the operating mechanism as viewed along the lines 6—6 of Figure 4.

Figure 7 is a sectional view along the lines 7—7 of Figure 6.

Figure 8 is an enlarged fragmentary sectional view along the lines 8—8 of Figure 1.

Figure 9 is an enlarged detail partly in section along the lines 9—9 of Figure 7.

Throughout the drawings like numerals indicate corresponding parts.

The mechanism consists of a case generally designated 1 which is preferably of light weight cast metal, such as aluminum alloy or magnesium alloy, or molded resinous material. The case has the general configuration of a closed folding camera although as usually constructed it is slightly larger than usual hand cameras. The case consists of an upper portion generally designated 2, having a front wall 3 and a rear wall 4 and rounded end walls 5 and 6. The top 7 of the case is formed integrally with the side walls as shown in Figure 5. The side walls 3 and 4 are provided with windows 10 and 11, respectively, which are preferably shaped so as to have the aspect of a theatre stage in miniature. Thus the windows are provided with a narrow molding 12 at each side and a curved molding 13 at the top and with a bottom molding 14, all of which cooperate to give the appearance of a stage. If desired, the outer surface of the box 1 may be covered with leather or artificial leather or with enamel finishes.

At the bottom edge 16 of the upper part 2 of the container, and equally distant from the side walls there is provided a cross-frame 20 (see Figure 6) which is attached to the front wall 3 and rear wall 4 by means of screws 21 and 22, respectively.

The bottom of the case is formed by a cover plate 25 which is likewise of cast metal or other relatively strong material. The cover plate is pivoted to the cross-frame member 20 by means of pivot screw 26, there being a large diameter, thin washer 27 between the cover plate 25 and cross-frame 20 so as to facilitate the pivoting of the upper portion 2 of the case relative to the bottom plate 25.

The lower edges 29 and 30 of the rounded end walls 5 and 6 are notched as illustrated at 31 in Figure 1. The notches are provided to receive a spring detent 32 which is mounted at one end of the base plate 25. The detent 32 protrudes as shown at 33 in Figures 1 and 3 and may be depressed to release the upper portion 2 of the case, for rotation with respect to the base.

The front central portion of the base is provided with a slot 35 shown in the dotted lines in Figure 6 which receives a tilt frame 36 which is preferably made of relatively rigid steel wire. The frame 36 may be retracted into the slot 35 or moved outwardly and then pivoted downwardly so as to provide a slight backward tilt to the whole case when the latter is placed on a flat surface such as a desk or table. This expedient facilitates reading of the printed matter through windows 10 and 11.

The data displaying mechanism of the case comprises an outer web 40 and inner webs 70 and 80. The outer web 40 is carried by a plurality of vertically disposed rolls 41, 42, 43 and 44. As is clearly illustrated in Figure 4 the rolls 41 and 42 are positioned adjacent the rounded end wall 6 of the casing and rolls 43 and 44 are positioned adjacent end wall 5. The web 40 is strung over rolls 41 and 43 and is accordingly maintained closely adjacent window 11. After passing over roll 43 the web 40 then passes over a small take-up roll 45 which is positioned slightly to the left of center and along the center line of the case as shown in Figure 4. After passing over the roll 45 the web 40 continues over roll 44 and thence closely adjacent window 10 to roll 42. After passing over roll 42 the web 40 traverses another small idler roll 46 and thence back to roll 41. It will thus be seen that web 40 is continuous.

Within the housing there is mounted an inner frame member 50 which is parallel to and spaced slightly above, the base plate 25 (see Figure 6) and an upper frame member 50A. The rolls 41, 42, 43 and 44 are pivoted upon shafts 51, 52, 53 and 54, respectively. The lower ends of each of the shafts are journaled in plate 50 and the upper ends in upper frame member 50A. The upper ends of shafts 51 and 54 protrude through the upper surface 7 and are provided with knobs 58 and 59, respectively. Shafts 52 and 53 are pivoted in the upper frame member 50A but do not protrude therethrough.

The rolls 45 and 46 likewise are pivoted on the inner frame 50 and the upper frame member 50A. Roll 45 is pivoted in slots running lengthwise of the plate 50, one of the slots being shown at 60 in Figure 4. A similar slot is provided in the upper frame member 50A. A spring 61 is provided at each end of the roll 45 so as to force it to the right, as shown in Figure 4. In this way the endless web 40 is maintained taut.

The inner web 70 which is positioned adjacent window 11 and behind the outer web 40 has a length which may be from 10 to 15 times as much as the overall length of the case depending upon the amount of data to be displayed. One end of web 70 is wound upon roll 71 which is carried by shaft 72. From roll 71 the web 70 runs to an idler roll 75, as shown in Figure 4 and thence parallel to outer web 40 to a second idler roll 76. After passing over idler roll 76 the web 70 continues to a second winding roll 78 which is mounted upon shaft 79. The winding and idler rolls are carried by shafts which are journaled at their lower ends in the inner frame 50 and at their upper ends in the upper frame member 50A.

At the opposite side of the casing there is a similar web 80, one end of which is wound on winding roll 81. Winding roll 81 is carried by a shaft 82, as will be explained in greater detail. From the winding roll 82 the web 80 passes over an idler roll 85 and thence parallel to web 40 to another idler roll 86. After passing over the latter the web 80 continues to another winding roll 88 which is journaled on shaft 89.

At the center of the case there is an operating shaft 100 which extends upwardly from the frame 20 and through the top 7 of the case. The upper protruding end of shaft 100 is provided with an operating knob 101.

Referring now to Figures 4, 6, 7 and 9 it will be seen that shafts 72 and 89 extend downwardly to the upper surface of plate 20 and each of these shafts is provided with a pinion. The pinion attached to shaft 72 is numbered 105 and is illustrated in Figure 6. The pinion attached to shaft 89 is not illustrated in Figure 6 but is shown in the dotted lines at 106 in Figure 7. Pinions 105 and 106 are sized so as to engage the large gear wheel 107 which is journaled for free rotation on operating shaft 100. This gear wheel is shown in Figures 6 and 9.

Roll shafts 82 and 79 extend below the inner frame 50 just sufficiently to carry pinions 115 and 116 respectively. Pinion 115 which is carried at the bottom of shaft 82 is illustrated in Figures 6 and 7. Pinion 116 which is carried at the bottom of shaft 79 is illustrated only in Figure 7. Pinions 115 and 116 are of the same size and engage a large gear 117 which is identical in size with gear 107.

Gears 107 and 117 are both journaled for free rotation upon operating shaft 100 as shown in Figure 9 and are spaced apart by collar 124. Gears 107 and 117 are held in assembled relation upon shaft 100 by a retaining collar 118 which is seated in a groove in the shaft.

In this connection it is noted that Figure 7 is a sectional view looking upwardly along the lines 7—7 of Figure 6 and pinions 105 and 106 accordingly do not show in Figure 7. However, their position with reference to shafts 72 and 89, respectively, is illustrated by the dotted lines. It is understood, of course, that pinions 105 and 106 mesh with lower gear 107 and that pinions 115 and 116 mesh with upper gear 117.

The upper surface of gear 107 is provided with a plurality of notches 119 and the lower surface of gear 117 is provided with a plurality of similar oppositely disposed notches 120. The notches 119 and notches 120 are formed to be engaged by a collar 122 which is provided with similar cooperating notches in its upper and lower surfaces, as shown in Figure 6, fitted so as to be slidable upwardly and downwardly on spacing collar 124. Collar 122 is provided with slanting slots 125 (see Figures 7 and 9) through which a drive pin 126 projects. The drive pin is fixed to the shaft and collar 124 and hence as the shaft 100 is rotated in a clockwise direction shown by the arrow 130 of Figure 3 the collar 122 will be forced down until the notches in its lower surface engage notches 119 of gear 107 and thereafter the gear 107 will be rotated with the collar and shaft 100. Likewise when the shaft 100 is rotated in the direction of arrow 131 of Figure 3 the effect of pin 126 upon notches 125 will be to force the collar 122 upwardly into engagement with the notches 120 in the upper surface of gear 117 at which time the gear 117 will rotate with collar 122 and shaft 100.

As gear 117 is thus rotated by shaft 100, gears 115 and 116 will be turned and shafts 82 and 79 which carry rolls 81 and 78, respectively, will likewise be rotated in a direction to wind webs 70 and 80, respectively, upon the rolls. At the same time due to the tension in webs 70 and 80 they will be unwound from rolls 88 and 71, respectively and the motion of these rolls will be maintained in synchronism due to the intergearing effect of pinions 105 and 106 upon gear 107. Hence the webs 70 and 80 will always be maintained in exactly the same position with respect to the other. Stated another way, when web 70 has been given a given increment of movement, a similar increment of movement will have taken place on web 80.

Likewise when the shaft 100 is rotated by knob 101 in the direction of arrow 131 and the collar 122 is clutched into driving engagement with gear 107 gears 105 and 106 will be rotated and shafts 72 and 89 upon which these gears are respectively mounted will accordingly be turned, carrying with them rolls 71 and 88 in a direction to wind webs 80 and 70. At this time rolls 78 and 81 run idle as the webs 80 and 70 are unwound therefrom but during this idle running rolls 78 and 81 are at all times unwound equally due to the intergearing effect of large gear 117 upon pinions 116 and 115, respectively.

Referring now to Figures 1 and 2, it will be seen that the outer web 40 of the device is provided with a plurality of cut-out openings 150 in the portion of the web which is normally adjacent the window 10 and with a plurality of cut-outs 160 in that portion of the web which is normally adjacent window 11. It is understood, of course, that these portions of the web 40 having the cut-outs, may be rotated out of sight of windows 10 and 11, respectively and advertising or other matter printed upon the web 40 rotated into sight of windows 10 and 11 by simply rotating knob 58 or knob 59, the cut-out portions of web 40 then being "stored" adjacent idler rolls 45 and 46.

Opposite the cut-outs 150 there are designations, as shown at 151 and 152 and adjacent cut-outs 160 there are designations 161 and 162. As will be apparent these designations relate to the particular business contract being explained.

Upon web 70, which as explained above, is from ten to fifteen times as long as the overall length of the case, there are printed groups of calculated data which are spaced so as to be visible through cut-outs 150 when the web 80 is drawn adjacent the cut-outs. Any desired number of groups of computed data may be included on web 80 and the number of columns of figures in a group may be varied in accordance with the data to be explained. Thus in Figure 1 there are illustrated two columns of figures 153 and 154 having to do with an investment contract.

On web 70 there are printed corresponding groups of figures relating to various specifications of the contract. The positions of the groups of figures which are printed on web 70 and the cut-outs of web 40 and the position of the groups of figures of the web 80 are related so that as the group of figures 153—154 is visible through cut-outs 150, corresponding figures will be visible at 163 and 164 through cut-outs 160.

At the base of window 10 there is provided a slide-way generally designated 170 which has a curved-over upper lip 171 and a lower groove 172 (see Figure 6). The slide-way extends not only in front of window 10 but around each curved end of the case as illustrated at 173 in Figure 8. The member 174 in this illustration serves to define the slide groove, but may if desired be a downwardly turned flange on inner frame member 50. Mounted in the slide there is provided a tape of Celluloid or other similar material which is somewhat flexible and yet sufficiently rigid to be propelled by means of a knob 175 attached at approximately the middle of the tape. The tape 170 is provided with a scale of designations 176 running from 0 to 75, of which that portion from 0 to 50 is illustrated in Figure 1. These designations may represent the life span of an individual, where the apparatus is used to explain a long term investment or insurance policy.

In the top of the casing, as shown in Figures 3 and 5, there are provided a plurality of data-displaying members generally designated 180. These are identical in construction except for the data thereby displayed. Each data-display consists of a main rectangular opening 181, a smaller rectangular opening 182, and a round opening 183 in the top part 7 of the case. Adjacent these openings is a pair of openings 184 through which knurled wheels, generally designated 185 and 186 project. One of the knurled wheels is shown in Figure 5 and consists of an outer race 187 which rides upon an inner hub 188. The hub is cut away to form an arcuate wedge-shaped slot 189. Within the slot there is positioned a ball 190 which is urged toward the narrow end of the slot by spring 191. The hub 188 is carried on shaft 192 which is in turn mounted upon a frame 193. One end of a data-displaying web 197 is attached to shaft 192.

The wheel 185 which is similarly constructed, drives shaft 195. By virtue of the wheel construction it is possible to rotate each of the shafts 192 and 195 only in the direction to wind the data-displaying web 197 thereon. Thus when the wheel race 187 is rotated in the direction of arrow 194 it will draw ball 190 into the narrow end of slot 191 and accordingly rotate shaft 192 to wind web 197, but when the race 187 is rotated oppositely to arrow 194 it will draw ball 190 into the wide end of slot 189 and hub 188 and shaft 192 are accordingly not rotated and the web is not wound. Wheel 185 is oriented so as to rotate its shaft in a direction opposite to arrow 194 on shaft 192 and hence the web 194 can be unwound from shaft 192 by virtue of wheel 185.

Each of the data-displaying devices 180 in the top of the case is identical and further description is therefore unnecessary.

In using the apparatus for explaining insurance and investment contracts to clients the sliding tape 170 is first adjusted by movement of knob 175 until the age designation 176 on the tape corresponding to the edge of the client is near the left side of window 10. The web 40 is normally in a position so that cut-outs 150 and 160 are out of sight within the case and advertising matter may be displayed through windows 10 and 11. In use the web is rotated until the data-displaying cut-outs 150 are in line with the age designation of the tape 170. This is accomplished by rotation of knobs 58 or 59. The knob 101 is then turned until the first column of data in a group corresponding to the particular contract or policy being discussed appears beneath the cut-outs 150.

By then rotating knob 58 or knob 59 web 40 may be advanced until over the next age designation on tape 170. At this point the next column of data in the group becomes visible through openings 150 in web 40.

At any time the detent 33 may be released and the entire upper portion 2 of the case be rotated so as to bring window 11 and the corresponding data of tape 70 around to the observer.

It is obvious that many modifications may be made in the apparatus illustrated and described without departing from the spirit of the invention described.

We claim:

1. A device for rapidly displaying data comprising a case having a window therein, an endless web mounted in said case for movement behind said window, said web having spaced openings therein, and another relatively much longer web having two ends mounted for movement back and forth behind said first mentioned web for displaying data through the openings in said endless web, and means for moving said webs.

2. A device for rapidly displaying related data comprising a case having windows on opposite sides thereof, a web mounted in said case for movement simultaneously behind the windows, said web being formed with a plurality of apertures visible through said windows, and a pair of elongated webs for display through said aperture, each having data thereon, said last mentioned webs being mounted one behind each of said windows, and means for moving said last mentioned webs synchronously so as simultaneously to display related data through the openings of said first web that are positioned behind said case windows.

3. A device for rapidly displaying related data comprising a case having windows on opposite sides thereof, a continuous web mounted in said case for movement simultaneously behind the windows, said web being formed with a plurality of apertures spaced so as to be visible through said windows, and a pair of elongated webs for display through said aperture, each having data thereon, said webs last mentioned being mounted one behind each of said windows, means for moving said last mentioned webs synchronously so as simultaneously to display related data through the openings of said first web that are positioned behind said case windows, and means for pivotally mounting said casing.

4. A device for rapidly displaying data comprising a case having a window in opposite faces thereof, an endless web mounted in said casing for movement across each of said window openings simultaneously, openings in said web spaced so as to be positioned some in alignment with one of said windows and others in alignment with the other of said windows, a display web having data at spaced intervals therealong for display through said openings, a scale mounted for movement adjacent one of said windows parallel to said webs, said scale having markings thereon correlated with the spacings of data on said display web, and means for moving said endless web so as to position certain of the openings thereon in alignment with markings on said scale.

5. A device for rapidly displaying data comprising a case having parallel faces, a window opening in each of said parallel faces, an outer web mounted in said casing for movement across each of said window openings simultaneously, said outer web being formed with openings which are spaced so that certain openings appear adjacent one window when certain other openings appear adjacent the other window, means on the outside of said case for moving said outer web, and a pair of inner webs each of which is a number of times longer than said case mounted within the case for movement adjacent the outer web, one inner web being substantially parallel with one window and the other substantially parallel with the other window, each of said inner webs being formed with designations for display through said outer web, a pair of spools for each inner web, and means for simultaneously revolving said spools so as simultaneously to move said inner webs.

6. A device for rapidly displaying data comprising a case having parallel faces, a window opening in each of said parallel faces, an outer web mounted in said casing for movement across each of said window openings simultaneously, said outer web being formed with openings which are spaced so that certain openings appear adjacent one window when certain other openings appear adjacent the other window, means on the outside of said case for moving said outer web, and a pair of inner webs each of which is a number of times longer than said case mounted within the case for movement adjacent the outer web, one inner web being substantially parallel with one window and the other substantially parallel with the other window, each of said inner webs being formed with designations for display through said outer web, a pair of spools for each inner web, upon which the ends of the web are wound, gear means for communicating the motion of a spool of one web to a spool of the other web, and means for operating said gear means from the outside of the casing.

7. A device for rapidly displaying data comprising a case having parallel faces, a window opening in each of said parallel faces, an outer web mounted in said casing for movement across each of said window openings simultaneously, said outer web being formed with openings which are spaced so that certain openings appear adjacent one window when certain other openings appear adjacent the other window, means on the outside of said case for moving said outer web, and a pair of inner webs each of which is a number of times longer than said case mounted within the case for movement adjacent the outer web, one inner web being substantially parallel with one window and the other substantially parallel with the other window, each of said inner webs being formed with designations for display through said outer web, a pair of spools for each inner web upon which the ends of the web are wound, a first gear means for communicating motion in like amounts to one of the spools of each of the inner webs, a second gear means for communicating motion in like amounts to the one of the spools of each of the inner webs, and manually operable means for selectively driving said gear means so as simultaneously to move the inner webs.

8. A device for rapidly displaying data comprising a case having parallel faces, a window opening in each of said parallel faces, an outer web mounted in said casing for movement across each of said window openings simultaneously, said outer web being formed with openings which are spaced so that certain openings appear adjacent one window when certain other openings appear adjacent the other window, means on the outside of said case for moving said outer web, and a pair of inner webs each of which is a number of times longer than said case mounted within the case for movement adjacent the outer web, one inner web being substantially parallel with one window and the other substantially parallel with the other window, each of said inner webs being formed with designations for display through said outer web, a pair of spools for each inner web upon which the ends of the web are wound, a first gear means for communicating motion in like amounts to one of the spools of each of the inner webs, a second gear means for communicating motion in like amounts to the other of the spools of inner web, a manually operable means for said first and second gear means and a clutch for connecting said first gear means to the manually operable means when the latter is rotated in one direction and for connecting said second gear means to the manually operable means when the latter is rotated in the other direction.

9. A device for rapidly displaying data comprising a case having parallel faces, a window opening in each of said parallel faces, an outer web mounted in said casing for movement across each of said window openings simultaneously, said outer web being formed with openings which are spaced so that certain openings appear adjacent one window when certain other openings appear adjacent the other window, means on the outside of said case for moving said outer web, and a pair of inner webs each of which is a number of times longer than said case mounted within the case for movement adjacent the outer web, one inner web being substantially parallel with one window and the other substantially parallel with the other window, each of said inner webs being formed with designations for display through said outer web, a pair of spools for each inner web upon which the ends of the web are wound, a first gear means for communicating motion in like amounts to one of the spools each of the inner webs, a second gear means for communicating motion in like amounts to the other spools of each of the inner webs, and a manually operable spindle for said first and second gear means for connecting said first gear means to the spindle when the latter is rotated in one direction and for connecting said second gear means to the spindle when the latter is rotated in the other direction.

10. A device for rapidly displaying investment or insurance data comprising a case having windows in opposite sides thereof, a web mounted in said case for movement simultaneously behind the windows in opposite sides of the case said web being provided with apertures spaced along the web so that certain apertures are visible through one window when other apertures are visible through a window in the opposite side of the case, a pair of webs of a length many times as long as the case, one of said last mentioned webs having investment or insurance data thereon for display through the apertures of the first mentioned web visible through one window and the other of said last mentioned webs having different but related investment or insurance data thereon for display through the apertures of the first mentioned web visible through a window on the opposite side of the case, and means for moving each of said last mentioned webs synchronously in spaced relation so as to simultaneously display the related investment or insurance data through the cooperating openings of the first mentioned web visible through the windows on opposite sides of the case.

EDGAR R. CHAMPION.
GLENN J. WOREL.